(12) United States Patent
Lim et al.

(10) Patent No.: US 9,661,548 B2
(45) Date of Patent: May 23, 2017

(54) METHOD AND TERMINAL FOR EXECUTING MEASUREMENT

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Byounghoon Kim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/123,058

(22) PCT Filed: Mar. 2, 2015

(86) PCT No.: PCT/KR2015/001996
§ 371 (c)(1),
(2) Date: Sep. 1, 2016

(87) PCT Pub. No.: WO2015/147452
PCT Pub. Date: Oct. 1, 2015

(65) Prior Publication Data
US 2016/0373990 A1 Dec. 22, 2016

Related U.S. Application Data

(60) Provisional application No. 61/971,539, filed on Mar. 28, 2014.

(51) Int. Cl.
*H04W 36/00* (2009.01)
*H04W 36/30* (2009.01)
(Continued)

(52) U.S. Cl.
CPC ....... *H04W 36/30* (2013.01); *H04W 36/0061* (2013.01); *H04W 36/0094* (2013.01); *H04W 48/16* (2013.01); *H04W 48/20* (2013.01)

(58) Field of Classification Search
CPC ............. H04W 36/30; H04W 36/0061; H04W 36/0094; H04W 48/16; H04W 48/20;
(Continued)

(56) References Cited

U.S. PATENT DOCUMENTS

| 2003/0081657 A1* | 5/2003 | Ranta | H04W 52/24 |
| | | | 375/147 |
| 2008/0253332 A1* | 10/2008 | Ore | H04J 11/0069 |
| | | | 370/331 |

(Continued)

FOREIGN PATENT DOCUMENTS

| WO | 2012023827 A2 | 2/2012 |
| WO | 2012144842 A2 | 10/2012 |
| WO | 2013051969 A1 | 4/2013 |

*Primary Examiner* — Mahendra Patel
(74) *Attorney, Agent, or Firm* — Lee, Hong, Degerman, Kang & Waimey PC

(57) ABSTRACT

A disclosure of the present specification presents a method for executing measurement including: measuring a first and a second logical cell of a base station and measuring a cell of a neighboring base station; and executing cell reselection according to a result of the measuring or transmitting a measurement report including the result of the measuring to the base station. In the method, since the base station operates the first logical cell in a first sub-frame set within a wireless frame and operates the second logical cell in a second sub-frame set within the wireless frame to which power backoff is applied, the measuring of the first logical cell by the base station may be executed in the first sub-frame set and the measuring of the second logical cell by the base station may be executed in the second sub-frame set to which the power-back off is applied.

10 Claims, 11 Drawing Sheets

(51) Int. Cl.
*H04W 48/16* (2009.01)
*H04W 48/20* (2009.01)

(58) Field of Classification Search
CPC ... H04W 24/10; H04W 24/02; H04W 84/045; H04W 72/082; H04W 28/048; H04W 11/00; H04J 3/14
USPC .......... 455/436; 370/252, 280, 230; 375/147
See application file for complete search history.

(56) References Cited

U.S. PATENT DOCUMENTS

| | | | | |
|---|---|---|---|---|
| 2011/0090884 | A1* | 4/2011 | Won | H04W 28/18 370/338 |
| 2011/0319120 | A1* | 12/2011 | Chen | H04W 52/367 455/522 |
| 2012/0052864 | A1* | 3/2012 | Swaminathan | H04W 36/0061 455/436 |
| 2012/0115485 | A1* | 5/2012 | Narasimha | H04W 68/02 455/437 |
| 2012/0207045 | A1* | 8/2012 | Pelletier | H04B 7/0404 370/252 |
| 2013/0058234 | A1* | 3/2013 | Yang | H04L 27/261 370/252 |
| 2013/0083753 | A1* | 4/2013 | Lee | H04W 72/0453 370/329 |
| 2013/0114505 | A1* | 5/2013 | Haim | H04W 52/146 370/328 |
| 2013/0182583 | A1* | 7/2013 | Siomina | H04W 24/10 370/252 |
| 2013/0229940 | A1* | 9/2013 | Baker | H04W 24/10 370/252 |
| 2013/0235759 | A1* | 9/2013 | Meshkati | H04W 24/02 370/254 |
| 2013/0242730 | A1* | 9/2013 | Pelletier | H04W 28/0284 370/230 |
| 2013/0301458 | A1* | 11/2013 | Barbieri | H04W 24/10 370/252 |
| 2013/0308485 | A1* | 11/2013 | Krishnamurthy | H04W 72/082 370/252 |
| 2014/0029455 | A1* | 1/2014 | Vitthaladevuni | H04W 48/18 370/252 |
| 2014/0036713 | A1* | 2/2014 | Hugl | H04W 24/10 370/252 |
| 2014/0086112 | A1* | 3/2014 | Stern-Berkowitz | H04W 72/1289 370/280 |

\* cited by examiner

US 9,661,548 B2

METHOD AND TERMINAL FOR EXECUTING MEASUREMENT

CROSS-REFERENCE TO RELATED APPLICATIONS

This application is the National Stage filing under 35 U.S.C. 371 of International Application No. PCT/KR2015/001996, filed on Mar. 2, 2015, which claims the benefit of U.S. Provisional Application No. 61/971,539, filed on Mar. 28, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

Furthermore, in a next-generation mobile communication system, improvements may be performed so that a higher order modulation scheme, for example, 256 Quadrature Amplitude Modulation (QAM) is used in a small cell.

However, 256 QAM is problematic in that it is possible only in a small cell having small transmission power and it is difficult in a BS having greater transmission power than a BS of a small cell until now due to several reasons.

SUMMARY OF THE INVENTION

Accordingly, an object of a disclosure of this specification is to solve the aforementioned problems. More specifically, an object of one disclosure of this specification is to allow a BS greater than a BS of a small cell to use a 256 QAM modulation scheme.

In order to achieve the aforementioned object, one disclosure of this specification is to support 256 QAM by lowering transmission power in such a manner that a BS adopts power backoff.

However, if a BS performs power backoff, the size of cell coverage may vary. Accordingly, if UE performs measurement on the BS performing power backoff without any information, the results of the measurement may look abnormal, and thus cell reselection and handover may be abnormally performed.

Accordingly, one disclosure of this specification proposes a method for performing, by UE, measurement on a BS that performs power backoff.

Specifically, one disclosure of this specification proposes a method for performing measurement. The method for performing measurement may include performing measurement on the first and second logical cells of a base station and measurement on a cell of a neighbor base station; and performing cell reselection based on a result of the measurement or sending a measurement report including a result of the measurement to the base station. In this case, the first logical cell of the base station is operated on a first subframe set within a radio frame and the second logical cell of the base station is operated on a second subframe set within the radio frame to which power backoff is applied. Accordingly, the measurement of the first logical cell of the base station may be performed on the first subframe set, and the measurement of the second logical cell of the base station may be performed on the second subframe set to which the power backoff is applied.

The method may further include the step of receiving one or more of information about the second subframe set and information about a cell capable of supporting 256 QAM.

A modulation scheme of maximum 64 Quadrature Amplitude Modulation (QAM) may be applied on the first subframe set, and a 256 QAM modulation scheme may be applied on the second subframe set.

The method may further include the step of receiving a handover command from the first logical cell to the second logical cell or a handover command from the second logical cell to the first logical cell from the base station after sending the measurement report.

The first logical cell and the second logical cell may have different cell IDs.

One disclosure of this specification also provides UE performing cell measurement. The UE may include an RF unit; and a processor which performs measurement on the first and second logical cells of a base station and measurement on a cell of a neighbor base station and performs cell reselection based on a result of the measurement or sends a measurement report including a result of the measurement to the base station by controlling the RF unit. In this case, the first logical cell of the base station is operated on a first subframe set within a radio frame and the second logical cell of the base station is operated on a second subframe set within the radio frame to which power backoff is applied. Accordingly, the measurement of the first logical cell of the base station may be performed on the first subframe set, and the measurement of the second logical cell of the base station may be performed on the second subframe set to which the power backoff is applied.

In accordance with a disclosure of this specification, the aforementioned problems of the conventional technology are solved.

DESCRIPTION OF EXEMPLARY EMBODIMENTS

Figure 1:
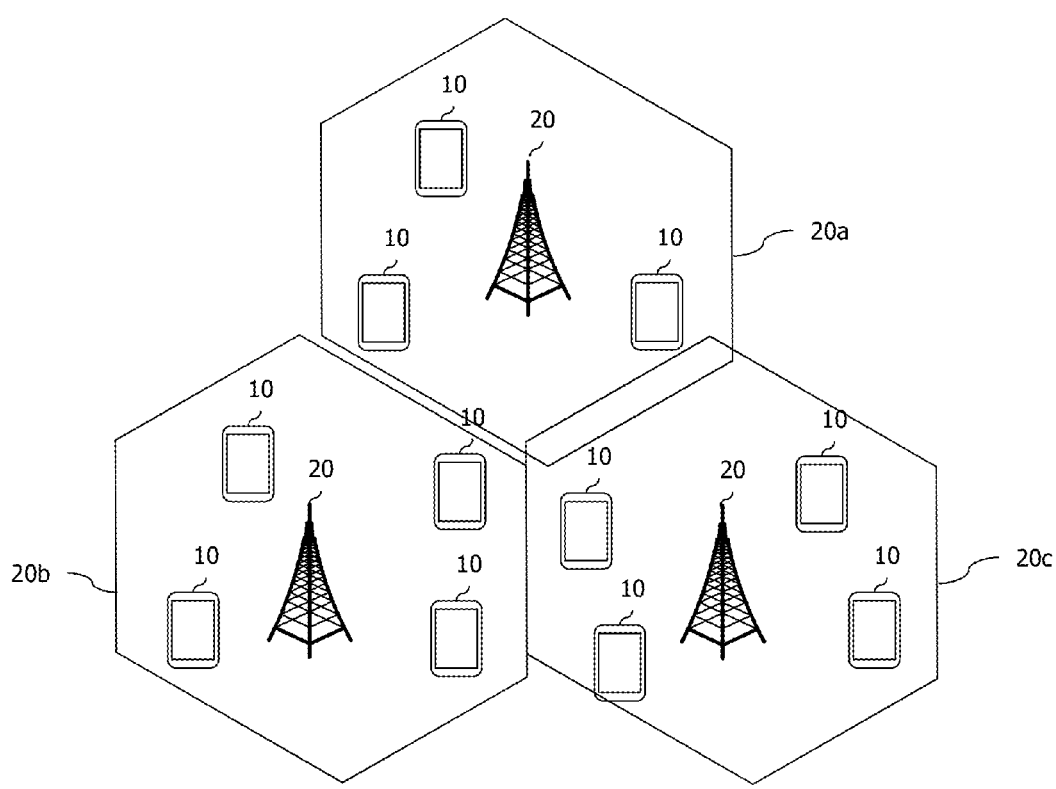
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
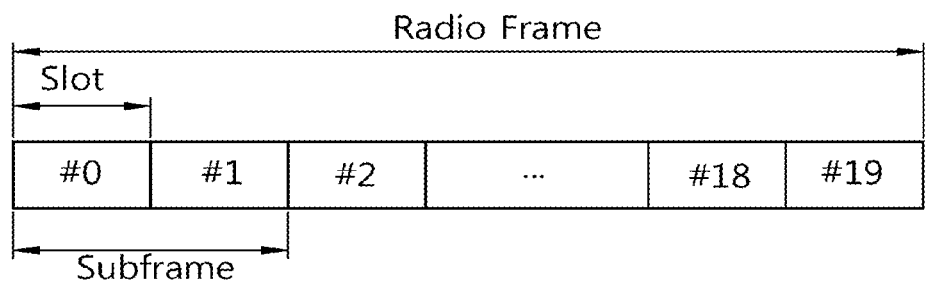
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
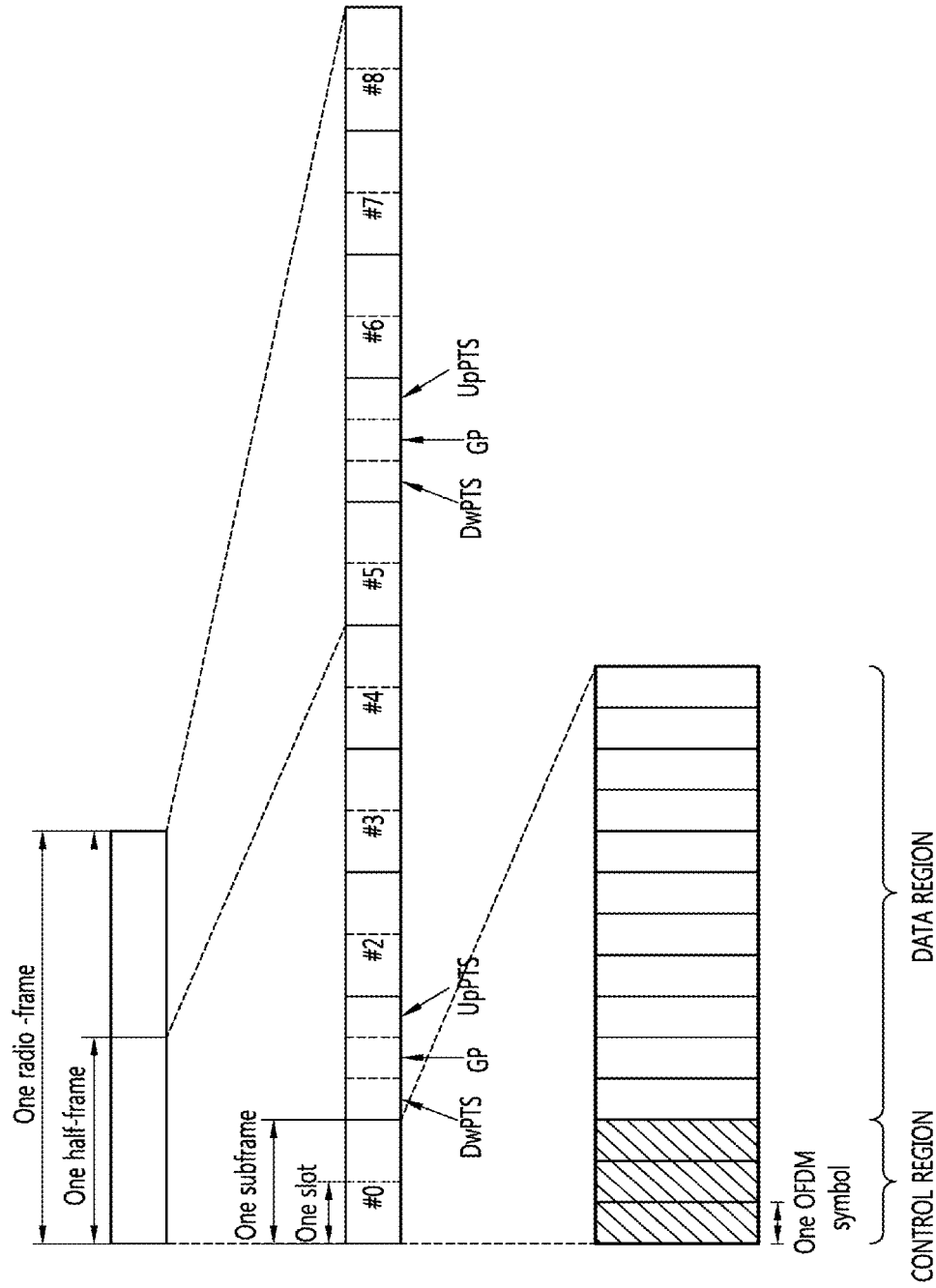
FIG. 3 illustrates a structure of a downlink radio frame according to TDD in the 3GPP LTE.

FIG. 3 Illustrates the Architecture of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
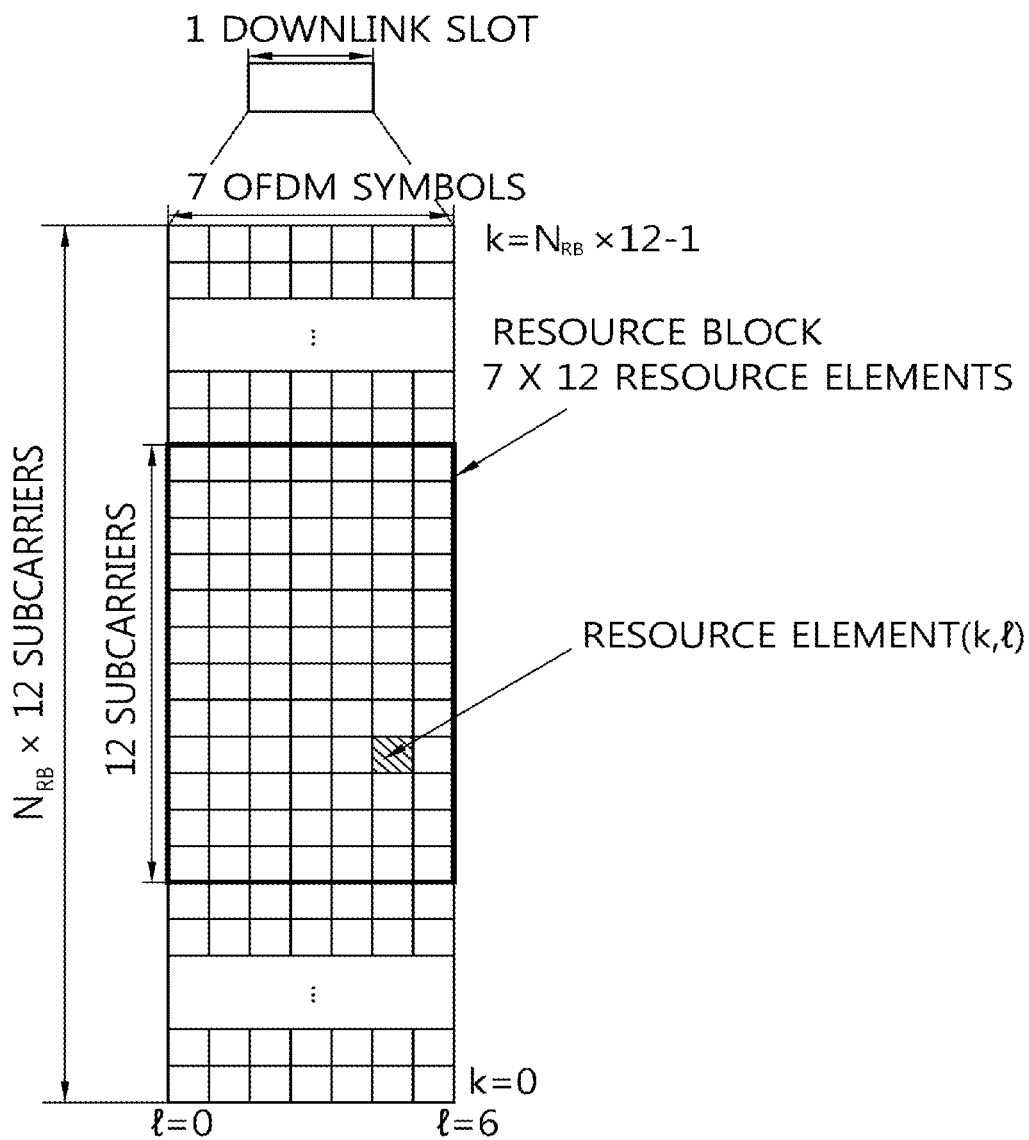
FIG. 4 is an exemplary diagram illustrating a resource grid for one uplink or downlink slot in the 3GPP LTE.

In 3GPP LTE, the resource grid for one uplink slot shown in FIG. 4 may also apply to the resource grid for the downlink slot.

Figure 5:
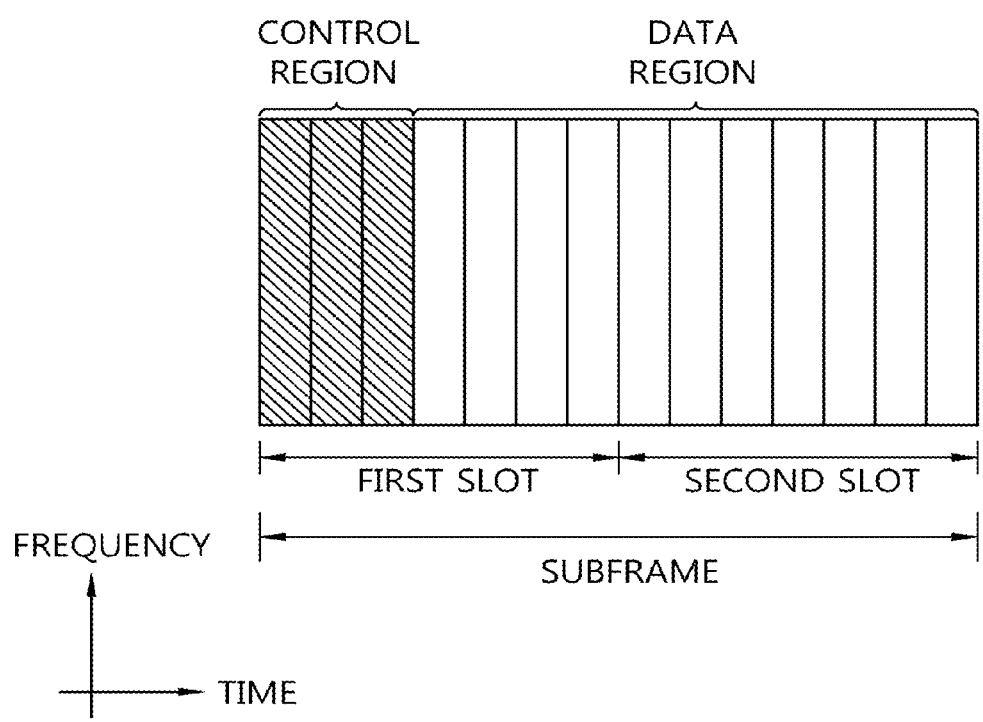
FIG. 5 illustrates a structure of a downlink subframe.

FIG. 5 Illustrates the Architecture of a Downlink Sub-Frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub- NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
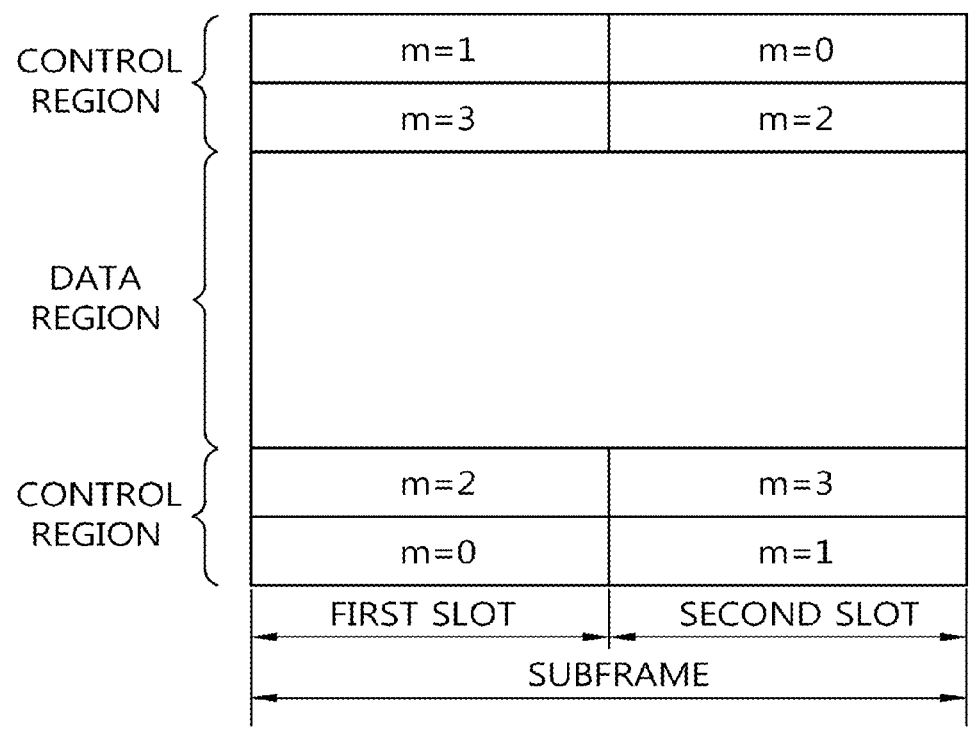
FIG. 6. illustrates a structure of an uplink subframe in 3GPP LTE.
Figure 6:
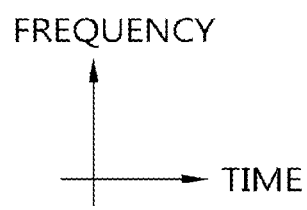

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator).Or, the uplink data may consist only of control information.

Figure 7:
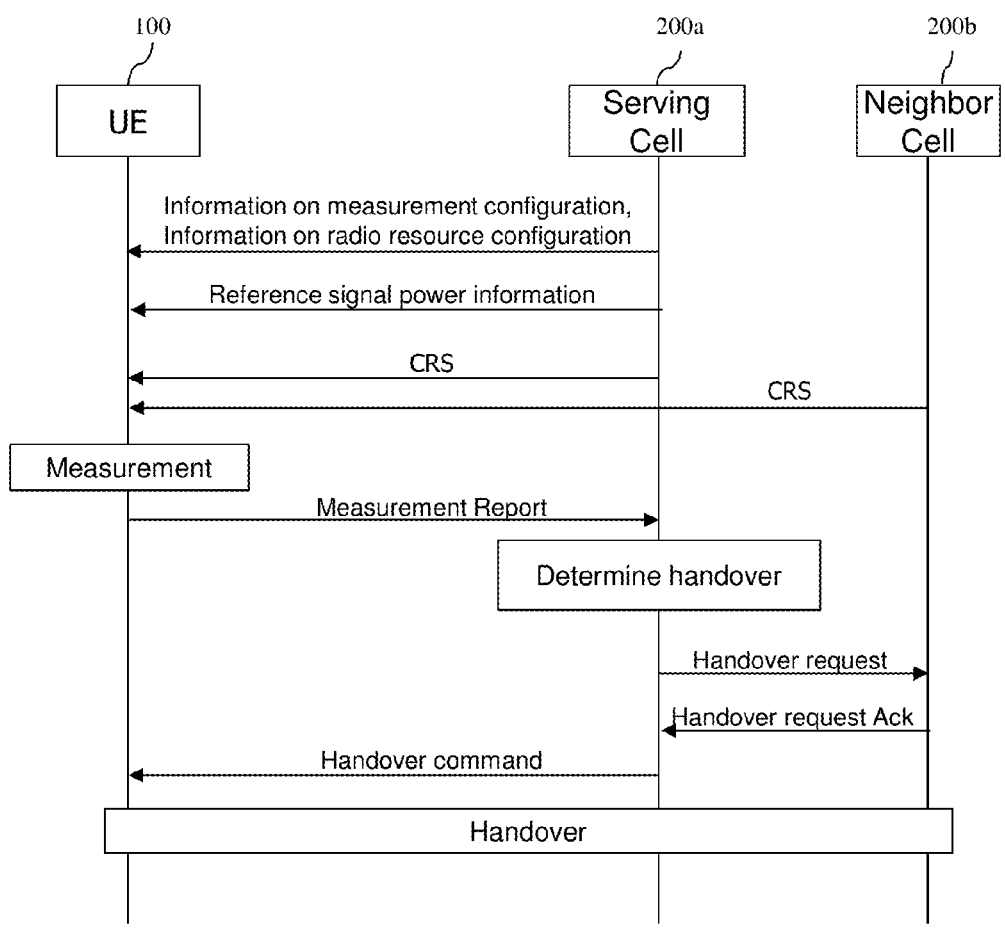
FIG. 7 shows a measurement and handover procedure.

FIG. 7 Shows a Measurement and Handover Procedure.

In a mobile communication system, the support of the UE 100 for mobility is essential. Accordingly, UE 100 continues to measure the quality of a serving cell that now provides services and the quality of a neighbor cell. The UE 100 reports the measurement results to a network at a proper time. The network provides optimum mobility to the UE through handover, etc. Measurement for such an object is commonly called Radio Resource Management (RRM) measurement.

As may be seen with reference to FIG. 7, when each of a serving cell 200a and a neighbor cell 200b sends a Cell-specific Reference Signal (CRS) to the UE 100, the UE 100 performs measurement through the CRS and sends a measurement report, including the measurement results, to the serving cell 200a.

In this case, the UE 100 may perform the measurement using the following three methods.

1) Reference Signal Received Power (RSRP): indicate average reception power of all REs that carry a CRS transmitted over the full band. In this case, average reception power of all REs that carry a CSI RS instead of the CRS may be measured.

2) A Received Signal Strength Indicator (RSSI): indicate reception power measured over the full band. The RSSI includes all of a signal, interference, and thermal noise.

3) Reference Symbol Received Quality (RSRQ): indicates CQI and may be determined to be RSRP/RSSI depending on a measurement bandwidth or subband. That is, RSRQ means a signal-to-noise interference ratio (SINR). Since RSRP does not provide sufficient mobility information, RSRQ may be used instead of RSRP in a handover or cell reselection process.

RSRQ may be calculated as RSSI/RSSP.

Meanwhile, the UE 100 receives a measurement configuration Information Element (IE) from the serving cell 100a for the measurement. A message including the measurement configuration IE is referred to as a measurement configuration message. In this case, the measurement configuration IE may be received through an RRC connection re-establishment message. If the measurement results satisfy a reporting condition within measurement configuration information, the UE reports the measurement results to a BS. A message including the measurement results is referred to as a measurement report message.

On the one hand, the UE 100 also receives a radio resource configuration Information Element (IE) as shown.

The radio resource configuration IE is used to configure/modify/release a radio bearer or used to modify an MAC configuration. The radio resource configuration IE includes subframe pattern information. The subframe pattern information is information about a measurement resource restriction pattern in a time domain, which is used to measure the RSRP, RSRQ of a primary cell (PCell).

On the other hand, when the serving cell 200a receives the measurement report, it determines whether or not to perform handover on the UE 100 to the neighbor cell 200b. If the serving cell 200a determine to perform handover on the UE 100 to the neighbor cell 200b, the serving cell 200a sends a handover request message to the neighbor cell 200b corresponding to a target cell. The neighbor cell 200b corresponding to the target cell sends a handover request Ack message to the serving cell 200a.

In response thereto, the serving cell 200a sends a handover command to the UE 100. In response thereto, the UE 100 performs handover from the serving cell 200a to the target cell 200b.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<Introduction of Small Cell>

Meanwhile, in a next-generation mobile communication system, it is expected that a small cell having a small cell coverage radius is added in the coverage of a legacy cell and that the small cell handles a greater amount of traffic. The legacy cell has a greater coverage than that of the small cell, and thus is also referred to as a macro cell, which is described with reference to FIG. 8.

Figure 8:
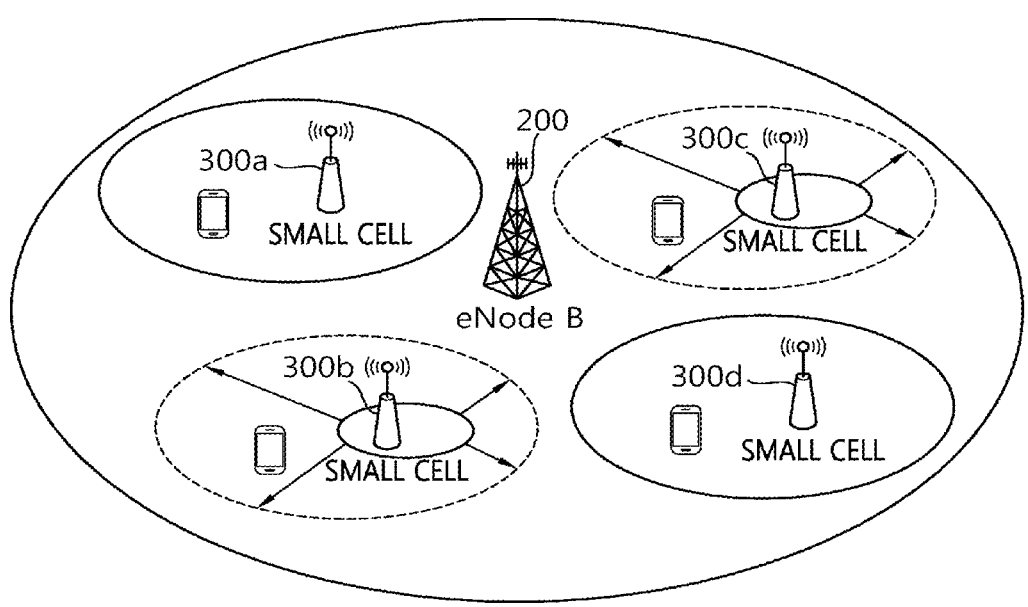
FIG. 8 illustrates a heterogeneous network environment in which a macro cell and a small cell coexist and which is possibly used in a next-generation wireless communication system.

FIG. 8 Illustrates a Heterogeneous Network Environment in which a Macro Cell and a Small Cell Coexist and which is Possibly Used in a Next-Generation Wireless Communication System.

FIG. 8 shows a heterogeneous network environment in which a macro cell of a legacy BS 200 overlaps with one or more small cells of small BSs 300a, 300b, 300c, and 300d. The legacy BS provides a greater coverage than the small BSs and thus is also referred to as a macro BS (macro eNodeB (MeNB)). In the present specification, the macro cell and the MeNB may be used together. A UE having access to the macro cell 200 may be referred to as a macro UE. The macro UE receives a downlink signal from the MeNB and transmits an uplink signal to the MeNB.

In this heterogeneous network, coverage holes of the macro cell may be filled by configuring the macro cell as a primary cell (Pcell) and by configuring the small cells as secondary cells (Scells). In addition, overall performance may be boosted by configuring the small cells as Pcells and by configuring the macro cell as a Scell.

<Introduction of 256 QAM>

In LTE/LTE-A, Binary Phase Shift Keying (BPSK), Quadrature Phase Shift Keying (QPSK), 16 Quadrature Amplitude Modulation (QAM), and 64 QAM were used as modulation schemes. However, in a next-generation mobile communication system, it is expected that a communication distance will be reduced due to the introduction of a small cell and thus the state of a wireless channel will become better. Accordingly, in order to maximize efficiency of a wireless channel, a high order modulation scheme, for example, 256 QAM may be used.

However, in order to support 256 QAM in downlink while guaranteeing a high SINR, the transmission (Tx) of a BS requires a very low Error Vector Magnitude (EVM), for example, 3~4% or less.

$$EVM = \sqrt{\frac{P_{error}}{P_{avg,tx}}}$$ [Equation 1]

In Equation 1, $P_{error}$ denotes power of an error vector, and $P_{avg,tx}$ denotes average transmission power of a transmission stage. As modulation order increases, the Euclidean distance between modulated symbols on a constellation may be reduced. Accordingly, performance deterioration in a system using higher modulation with respect to the same EVM may be increased.

The EVM has a close correlation with the RF output of a BS, and is thus reduced as the RF output increases. The power class of a BS according to LTE/LTE-A is defined in 3GPP standard 36.104 and is defined in a table form, for convenience sake.

TABLE 3

| BS CLASS | PRAT |
|---|---|
| Wide area BS | |
| Medium range BS | <+38 dBm |
| Local area BS | <+24 dBm |
| Home BS | <+20 dBm (for one transmit antenna port) |
| | <+17 dBm (for two transmit antenna ports) |
| | <+14 dBm (for four transmit antenna ports) |
| | <+11 dBm (for eight transmit antenna ports) |

The Tx EVM of a BS according to LTE/LTE-A is defined in 3GPP standard 36.104 and is defined in a table form, for convenience sake.

TABLE 4

| MODULATION SCHEME FOR PDSCH | REQUIRED EVM [%] |
|---|---|
| QPSK | 17.5% |
| 16QAM | 12.5% |
| 64QAM | 8% |

When a current RF technology is considered, in general, a Tx EVM of 3~4% or less may be implemented in a BS having RF output of 24 dBm or less. Accordingly, in the current LTE/LTE-A standards, 256 QAM can be supported because only a BS of a small cell, for example, a home BS or a local area BS can have a Tx EVM of 3~4%.

In contrast, if a low EVM is maintained in a BS for a cell greater than a small cell, an implementation may become complicated in terms of hardware and thus the low EVM is not preferred because a cost is increased that much.

In other words, a BS having RF output exceeding 24 dBm is unable to support 256 QAM because a Tx EVM of 3~4% is unable to be obtained. Accordingly, in order to support 256 QAM, the following schemes may be used.

a) Use an RF amplifier of high linearity.

b) Collect pieces of UE which will use a 256 QAM modulation scheme within a specific resource and perform transmission, but reduce transmission power c) Reduce transmission power so that an EVM of 4% or less is guaranteed with respect to all of pieces of UE.

If an RF amplifier of high linearity is used as in the scheme a, however, consumption power is increased and an RF element of an additional high capacity/high price is required due to a reduction of power efficiency. As a result, a problem of a cost rise is generated and there is a problem in that power consumption suddenly increases. However, the scheme a may be advantageous in that 256 QAM can be applied if a BS is a BS for a cell slightly greater than a small cell (e.g., a medium range cell).

In the aforementioned schemes b and c, an error attributable to non-linearity in the power amplifier of a transmission stage is reduced by reducing the range of transmission power. To reduce transmission power as described above is called power backoff. Such a power backoff scheme may be more effective because an existing transmitter can be used without any change. Transmission power of a medium range BS is about 38 dBm. Accordingly, if a medium range BS performs power backoff by 14 dB, the final transmission power becomes 24 dBm. Accordingly, a 256 QAM modulation scheme may be used. Such 24 dBm transmission power corresponds to transmission power of a local area BS.

However, the scheme b has a disadvantage in that UE has to send pattern information about subframes because a BS schedules resources for pieces of UE that will use a 256 QAM modulation/demodulation scheme within a specific resource region, for example, a specific subframe as in a TDM scheme.

The scheme c has a disadvantage in that cell coverage of a BS is fixedly reduced because power transmitted by all pieces of UE has to be reduced to 24 dBm or less in order for a BS of a medium range cell to support a 256 QAM modulation scheme.

The method b may be most effective by taking into consideration all of the advantages and disadvantages.

In accordance with the scheme b, however, power backoff is not performed in a common subframe, but power backoff is performed in a specific subframe. As a result, transmission power is different for each subframe, and cell coverage is different for each subframe. If cell coverage is different for each subframe as described above, it is difficult for UE far from the center of a cell to be provided with stable service.

<Solving Method of this Specification>

Accordingly, an object of one disclosure of this specification is to solve the aforementioned problems.

Specifically, one disclosure of this specification allows a BS to operate as two logical cells according to a TDM scheme. In this case, a first logical cell is a common cell, and a second logical cell is a virtual cell on which power backoff is performed. A BS alternately operates as the first logical cell and the second logical cell depending on a subframe pattern. During a subframe in which the BS operates as the second logical cell, power backoff is performed on transmission power for sending downlink data to pieces of UE that will use a 256 QAM modulation/demodulation scheme.

If a BS alternately operates as the two logical cells as described above, UE has to send a measurement report including two measurement results (i.e., two types of RSRP and RSRQ). This is described in detail with reference to FIG. 9.

Figure 9:
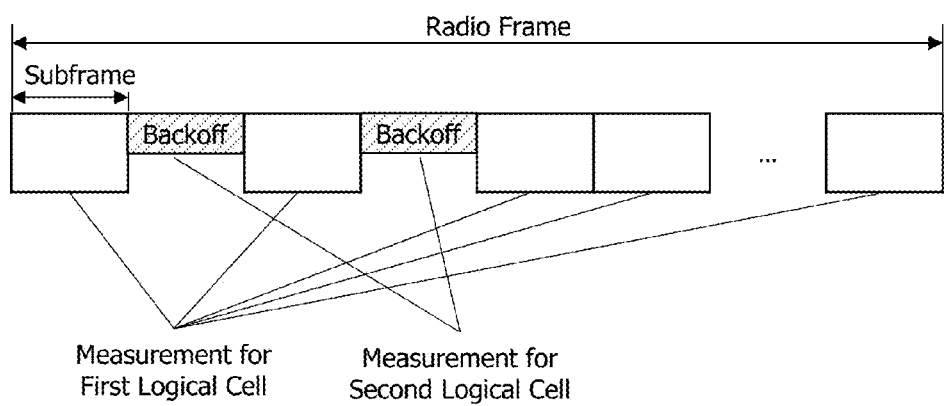
FIG. 9 is an exemplary diagram showing a measurement method according to one disclosure of this specification.

FIG. 9 is an Exemplary Diagram Showing a Measurement Method According to One Disclosure of this Specification.

Referring to FIG. 9, during a period in which a BS operates as a first logical cell, for example, during a common subframe, the BS operates a medium range cell by applying a modulation scheme of 64 QAM or less. Accordingly, UE performs RSRP/RSRQ measurement during the common subframe only and sends a measurement report, including the results of the measurement, to the BS operating as the first logical cell.

In contrast, during a period in which the BS operates as a second logical cell, for example, during a specific subframe, the BS operates as a small cell of 24 dBm or less by applying a 256 QAM modulation scheme. Accordingly, the UE performs RSRP/RSRQ measurement during the specific subframe only and sends a measurement report, including the results of the measurement, to the BS operating as the second logical cell.

In this case, the cell ID of the first logical cell and the cell ID of the second logical cell may be different.

Meanwhile, since the BS alternately operates as the two logical cells, the UE may have to perform handover to the second logical cell corresponding to a virtual cell or may have to perform cell reselection. This is described below with reference to FIG. 10.

Figure 10:
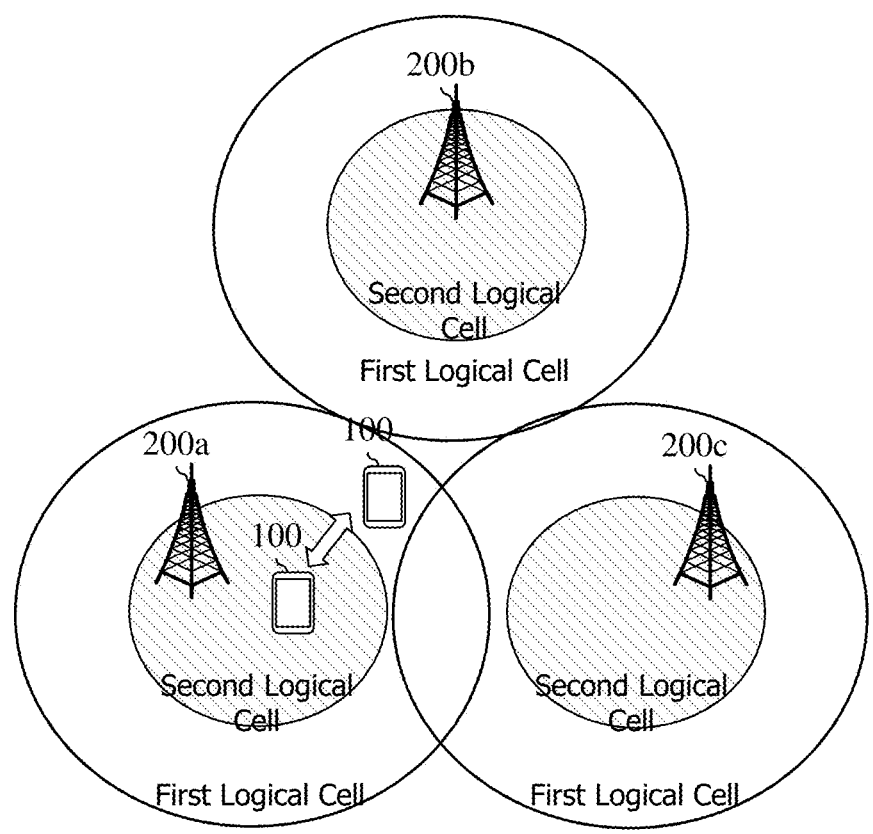
FIG. 10 is an exemplary diagram showing the handover of UE in a situation in which a BS alternately operates as two logical cells in accordance with one disclosure of this specification.

FIG. 10 is an Exemplary Diagram Showing the Handover of UE in a Situation in which a BS Alternately Operates as Two Logical Cells in Accordance with One Disclosure of this Specification.

FIG. 10 shows an example in which if each of a first BS 200a, a second BS 200b, and a third BS 200c operates as a first logical cell and switches and operates as a second logical cell, cell coverage is changed. In this case, it is assumed that if each BS uses a first cell ID if it operates as the first logical cell and uses a second cell ID if it operates as the second logical cell.

The illustrated UE 100 is served by the first BS 200a. More specifically, the first BS 200a compares each of the RSRP (RSRP_cell#1) value of the first logical cell included in a measurement report transmitted by the UE 100 and the RSRP (RSRP_cell#2) value of the second logical cell included in the measurement report with a threshold. If both the two values are the threshold or more, the first BS 200a configures the second logical cell as a serving cell and schedules the corresponding UE using all of subframes, but sends data, modulated according to a 256 QAM modulation scheme, only on a subframe set associated with the second logical cell.

If a 256 QAM modulation/demodulation scheme is used as described above, the UE 100 is served by the first logical cell of the first BS 200a.

If the UE 100 moves in the outskirt direction of coverage of the first logical cell of the first BS 200a, however, the UE 100 performs measurement of the first logical cell of the first BS 200a and measurement on the neighbor second BS 200b, and sends a measurement report to the first BS 200a.

If signal intensity of the first logical cell of the first BS 200a measured by the UE 100 satisfies a handover criterion based on the measurement report, the first BS 200a virtually performs handover on the UE 100 to the first logical cell. To this end, the first BS 200a sends a handover command for the first logical cell to the UE 100. In this case, the first BS 200a stops to send data to the UE 100 on the second cell according to the 256 QAM modulation scheme, but sends data to the UE 100 on the first logical cell corresponding to a target cell for handover according to a modulation scheme of 64 QAM or less.

More specifically, if the RSRP (RSRP_cell#2) of the second logical cell is gradually deteriorated and thus becomes the threshold or less and the RSRP (RSRP_cell#1) of the first logical cell becomes smaller than a previous value, but is still the threshold or more and thus satisfies the handover criterion, the first BS 200a virtually performs handover on the UE 100 to the first logical cell. To this end, the first BS 200a sends a handover command for the first logical cell to the UE 100. In this case, the BS 200a may send downlink data to the UE 100 only on a subframe set associated with the first logical cell according to a modulation scheme of 64 QAM or less.

On the contrary, while the first logical cell of the first BS 200a sends downlink data according to the modulation scheme of 64 QAM or less in the first logical cell area of the first BS 200a, if the UE 100 gradually approaches the second logical cell area and thus the RSRP (RSRP_cell#2) value of the second logical cell exceeds the threshold, the first BS 200a virtually performs handover on the UE 100 to the second logical cell. In response thereto, the second logical cell of the first BS 200a sends downlink data on a subframe set associated with the second logical cell according to the 256 QAM modulation scheme.

Meanwhile, a situation in which the UE 100 is in an RRC idle state not an RRC connected state is described below.

First, each BS sends a white list, including information about a neighbor cell, to the UE through an RRC signal. In this case, the information may include capability information about whether a corresponding cell supports 256 QAM or not. The information includes information about a restricted subframe set in which a small cell supporting 256 QAM operates and information about a common subframe set in which a medium range cell not supporting 256 QAM operates.

For example, it is assumed that the UE 100 has been located within coverage of the second logical cell of the first BS 200a and then moved. At this time, in on duration of a discontinuous reception (DRX) period, if an RSRP value measured on a subframe in which the second logical cell of the first BS 200a operates is gradually reduced and becomes a threshold or less at which cell reselection is performed, the UE 100 performs measurement on the first logical cell of the first BS 200a using BS information, 256 QAM capability information, and common/restricted subframe information within the received white list. If a result of the measurement of the RSRP value of the first logical cell of the first BS 200a satisfies a cell reselection criterion, the UE 100 performs cell reselection for the first logical cell.

On the one hand, it is assumed that the UE in an idle state in the coverage area of the first logical cell of the first BS 200a moves in the direction of the first logical cell of the second BS 200b. At this time, if a measured RSRP value of the first logical cell of the first BS 200a is gradually reduced and then becomes a threshold or less at which cell reselection is performed, the UE 100 performs measurement on a neighbor cell. If a measured RSRP value of the first logical cell of the second BS 200b satisfies a cell reselection criterion, the UE 100 performs cell reselection on the first logical cell of the second BS 200b.

On the other hand, if the UE has performed handover or cell reselection from a small cell corresponding to the second logical cell of the first BS 200a to a medium range cell corresponding to the first logical cell, the first BS 200a may perform CRS versus power boosting on data that belongs to data transmitted to the UE 100 and that is modulated according to a modulation scheme of 64 QAM or less without generally increasing transmission power. That is, the first BS 200a sends a CRS signal according to coverage of a small cell and performs CRS versus power boosting on a PDSCH only. In this case, if the power boosting performed by the first BS 200a is for reducing the influence of interference from the first logical cell corresponding to the medium range cells of the second BS 200b and the third BS 200c that neighbor the first BS 200a, each of the second BS 200b and the third BS 200c may operate as only a second logical cell corresponding to a small cell as in a case where an ABS scheme in eICIC is applied, thus being capable of further increasing the power boosting effect of the first BS 200a.

Alternatively, the BSs may exchange information about a subframe set to which power boosting is applied through an X2 interface. Accordingly, each BS may send only the CRS or may not send both the CRS and data in order to prevent interference during a subframe period in which a counterpart BS applies power boosting.

The embodiments of the present invention described so far may be implemented through various means. For example, the embodiments of present invention may be implemented by hardware, firmware, software or a combination of them. This is described in detail with reference to FIG. 11.

Figure 11:
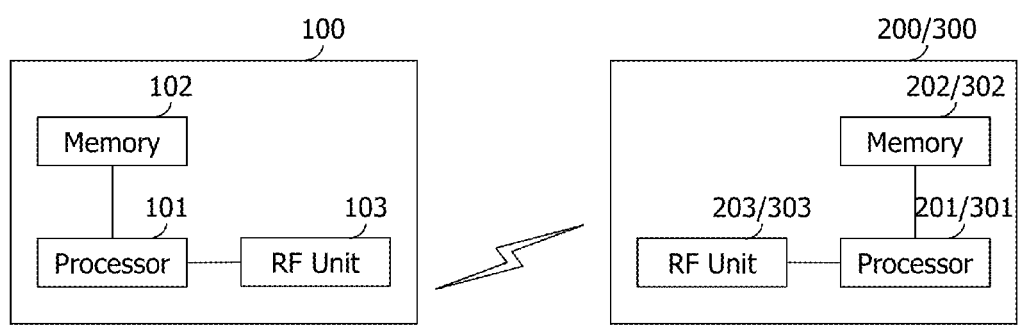
FIG. 11 is a block diagram of a wireless communication system in which a disclosure of this specification is implemented.

FIG. 11 is a Block Diagram of a Wireless Communication System in which a Disclosure of this Specification is Implemented.

The BS 200/300 includes a processor 201/301, memory 202/302, and a Radio Frequency (RF) unit 203/303. The memory 202/302 is connected to the processor 201/301 and stores various pieces of information for driving the processor 201/301. The RF unit 203/303 is connected to the processor 201/301 and sends and/or receives a radio signal. The processor 201/301 implements the proposed functions, processes and/or methods. In the aforementioned embodiments, the operation of the BS may be implemented by the processor 201/301.

The UE 100 includes a processor 101, memory 102, and an RF unit 103. The memory 102 is connected to the processor 101 and stores various pieces of information for driving the processor 101. The RF unit 103 is connected to the processor 101 and sends and/or receives a radio signal. The processor 101 implements the proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When an embodiment is implemented in software, the aforementioned scheme may be implemented using a module (process or function, etc.) which performs the aforementioned function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing measurement, comprising:
performing measurement on first and second logical cells of a base station and measurement on a cell of a neighbor base station; and
performing cell reselection based on a result of the measurement or sending a measurement report comprising a result of the measurement to the base station,
wherein the first logical cell of the base station is operated on a first subframe set within a radio frame and the second logical cell of the base station is operated on a second subframe set within the radio frame to which power backoff is applied,
wherein the measurement of the first logical cell of the base station is performed on the first subframe set, and
wherein the measurement of the second logical cell of the base station is performed on the second subframe set to which the power backoff is applied.

2. The method of claim 1, further comprising:
receiving one or more of information about the second subframe set and information about a cell capable of supporting 256 QAM.

3. The method of claim 1, wherein:
a modulation scheme of maximum 64 Quadrature Amplitude Modulation (QAM) is applied on the first subframe set, and
a 256 QAM modulation scheme is applied on the second subframe set.

4. The method of claim 1, further comprising:
receiving a handover command from the first logical cell to the second logical cell or a handover command from the second logical cell to the first logical cell from the base station after sending the measurement report.

5. The method of claim 1, wherein the first logical cell and the second logical cell have different cell IDs.

6. A user equipment for performing cell measurement, comprising:
an RF unit; and
a processor which performs measurement on first and second logical cells of a base station and measurement on a cell of a neighbor base station and performs cell reselection based on a result of the measurement or sends a measurement report comprising a result of the measurement to the base station by controlling the RF unit,
wherein the first logical cell of the base station is operated on a first subframe set within a radio frame and the second logical cell of the base station is operated on a second subframe set within the radio frame to which power backoff is applied,
wherein the measurement of the first logical cell of the base station is performed on the first subframe set, and
wherein the measurement of the second logical cell of the base station is performed on the second subframe set to which the power backoff is applied.

7. The user equipment of claim 6, wherein one or more of information about the second subframe set and information about a cell capable of supporting 256 QAM are further received.

8. The user equipment of claim 6, wherein:
a modulation scheme of maximum 64 Quadrature Amplitude Modulation (QAM) is applied on the first subframe set, and
a 256 QAM modulation scheme is applied on the second subframe set.

9. The user equipment of claim 6, wherein the processor further receives a handover command from the first logical cell to the second logical cell or a handover command from the second logical cell to the first logical cell from the base station after sending the measurement report.

10. The user equipment of claim 6, wherein the first logical cell and the second logical cell have different cell IDs.

* * * * *